United States Patent
Doolittle et al.

(10) Patent No.: US 6,568,513 B1
(45) Date of Patent: May 27, 2003

(54) DRUM BRAKE

(75) Inventors: James E. Doolittle, Granger, IN (US); Lawrence W. Rusk, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/083,204

(22) Filed: Feb. 26, 2002

(51) Int. Cl.$^7$ ............................................. F16D 51/00
(52) U.S. Cl. ................... 188/331; 188/79.55; 188/79.56
(58) Field of Search .......................... 188/79.51, 79.53, 188/79.55, 79.56, 79.58, 79.57, 196 B, 196 BA, 331

(56) References Cited

U.S. PATENT DOCUMENTS

| | | | | |
|---|---|---|---|---|
| 2,788,866 A | * | 4/1957 | Porsche et al. | 188/79.56 |
| 3,010,544 A | * | 11/1961 | Dahle et al. | 188/79.56 |
| 3,034,602 A | * | 5/1962 | Bauman | 188/79.56 |
| 3,204,729 A | * | 9/1965 | Barnes | 188/216 |
| 3,221,842 A | * | 12/1965 | Shampton | 188/79.56 |
| 3,232,391 A | * | 2/1966 | Burnett | 188/363 |
| 3,277,981 A | * | 10/1966 | Swift | 188/340 |
| 3,384,205 A | * | 5/1968 | Chouings | 188/331 |
| 3,420,340 A | * | 1/1969 | Hopf | 188/79.56 |
| 4,220,227 A | * | 9/1980 | Kluger | 188/196 BA |
| 4,223,765 A | * | 9/1980 | Turak | 188/79.54 |
| 4,249,646 A | * | 2/1981 | Roberts | 188/328 |
| 4,353,441 A | * | 10/1982 | Roberts | 188/328 |
| 4,564,090 A | * | 1/1986 | Spaargaren | 188/331 |
| 4,753,325 A | * | 6/1988 | Jaksic | 188/2 D |
| 5,167,304 A | * | 12/1992 | Capek | 188/325 |
| 5,377,793 A | * | 1/1995 | Livingston et al. | 188/331 |
| 6,328,141 B1 | * | 12/2001 | Asai et al. | 188/79.52 |
| 6,394,237 B1 | * | 5/2002 | Asai | 188/79.51 |

* cited by examiner

Primary Examiner—Christopher P. Schwartz
Assistant Examiner—Deion Kramer
(74) Attorney, Agent, or Firm—Leo H McCormick, Jr.; Warren Comstock

(57) ABSTRACT

An adjustment arrangement for a non-servo drum brake having a hydraulic actuator that engages a first web of a first brake shoe and a second web of a second brake shoe. The hydraulic actuator on receiving a hydraulic input develops an actuation force for moving the first and second brake shoes from a rest position into engagement with a rotatable member to effect a brake application. An extendible member, that is connected to the first web and the second web, is extendable to define a running clearance in a rest position between the first and second brake shoes and the rotatable member. A lever arm, that is mounted on the first web, engages the extendable member. A resilient member extends between the lever to the second web to urge the first and second webs into engagement with the hydraulic actuator. The lever arm pivots on the first web as the first web moves through the running clearance during a brake application. When the running clearance reaches a predetermined maximum gap, the lever pivots sufficiently to rotate the extendible member and extend the extendible member to establish a minimum gap for the running clearance. The adjustment arrangement is characterized by the first web having a first engagement surface connected to the hydraulic actuator and a second engagement surface connected to the extendible member. The first engagement surface receiving the actuation force from the hydraulic actuator to move the first brake shoe through the running clearance and into engagement with the rotatable member to effect the brake application. The first web has a cantilever arm through which the first engagement surface is connected to the second engagement surface such that movement of the second engagement surface in response to the actuation force is limited as a function of the resiliency of the cantilever arm.

10 Claims, 3 Drawing Sheets

DRUM BRAKE

This invention relates to an adjuster arrangement for a drum brake that establishes a running clearance between a friction surface and a drum and prevents an over adjustment of the running clearance when an actuation force moves a web into engagement with a rotatable member during a brake application.

BACKGROUND OF THE INVENTION

Non-servo drum brakes as disclosed in U.S. Pat. Nos. 4,101,011; 4,220,227 and 4,223,765 have an extendable strut located between a first web of a first brake shoe and a second web of a second brake shoe to control a running clearance between the brake shoes and a drum. A pawl located on the first brake shoe has an arm that engages a ratchet wheel on the extendable strut to provide for an extension of the extendable strut when the running clearance reaches a maximum width. This type of structure for adjusting the running clearance functions in an adequate manner in a drum brake during a normal braking application. However, it has been observed in a brake system that includes a traction control and/or a sway control system it is possible to over adjust the running clearance. On investigation, it was found that a cause of the over adjust is due to the level of the actuation force acting on the first and second webs to move the first and second brake shoes into engagement with the drum actually compressed the brake pads and/or distorted the structural components sufficiently to indicate a greater linear distance than actually needed to move from a position of rest to an actuation position. Thus on termination of the actuation force, when the running clearance is over adjusted, it is possible that the brake shoes in an extreme situation may actually remain engaged with the drum. In such an extreme situation, the brake shoes cause a drag that remains until wear has removed lining material from the brake shoes.

SUMMARY OF THE INVENTION

A primary object of the present invention is to provide a drum brake with an arrangement to prevent over adjustment of an extendable strut that controls running clearance.

According to this invention, the drum brake has a hydraulic actuator that engages a first web of a first brake shoe and a second web of a second brake shoe. An extendible member is located between the first web and the second web and is extendable to define a running clearance in the rest position between friction pads associated with the first and second brake shoes and the rotatable member. A lever arm is mounted on the first web and engages the extendable member. A resilient member extends between the lever to the second web to urge the first and second webs into engagement with the hydraulic actuator. When an operator desires to effect a brake application, pressurized hydraulic fluid is supplied as an input to the hydraulic actuator for developing an actuation force to move the first and second brake shoes from a rest position to a position where the corresponding friction pads thereon engage a rotatable member to effect the brake application. As the first web moves through the running clearance, the lever arm pivots with respect to the first web and when the running clearance reaches a predetermined maximum gap the lever pivots sufficiently to provide for extension of the extendible member. The extension of the extendible member moves the first and second shoes closer to the rotatable member and thereby establishes a minimum width for the running clearance between the friction pads and the rotatable member. The adjustment arrangement is characterized in that the first web has a first engagement surface connected to the hydraulic actuator and a second engagement surface connected to the extendible member. The first engagement surface receives the actuation force directly from the hydraulic actuator in moving the first brake shoe through the running clearance to the position where the friction pad engages the rotatable member during a brake application. The first web has a cantilever arm through which the first engagement surface is connected to the second engagement surface and as a result movement of the second engagement surface in response to the actuation force is limited as a function of the resiliency of the cantilever arm. However, a manual input force applied to the second engagement surface through the extendible member is directed into the first engagement surface without substantially flexing the cantilever arm to effect a manual brake application.

An advantage of this invention resides in a drum brake wherein a hydraulic actuation for developing an actuation force to move first and second webs associated with corresponding friction shoes into engagement with a rotatable member to effect a brake application is modified through a resilient member to limit an adjustment of the running clearance.

DETAILED DESCRIPTION

Figure 1:
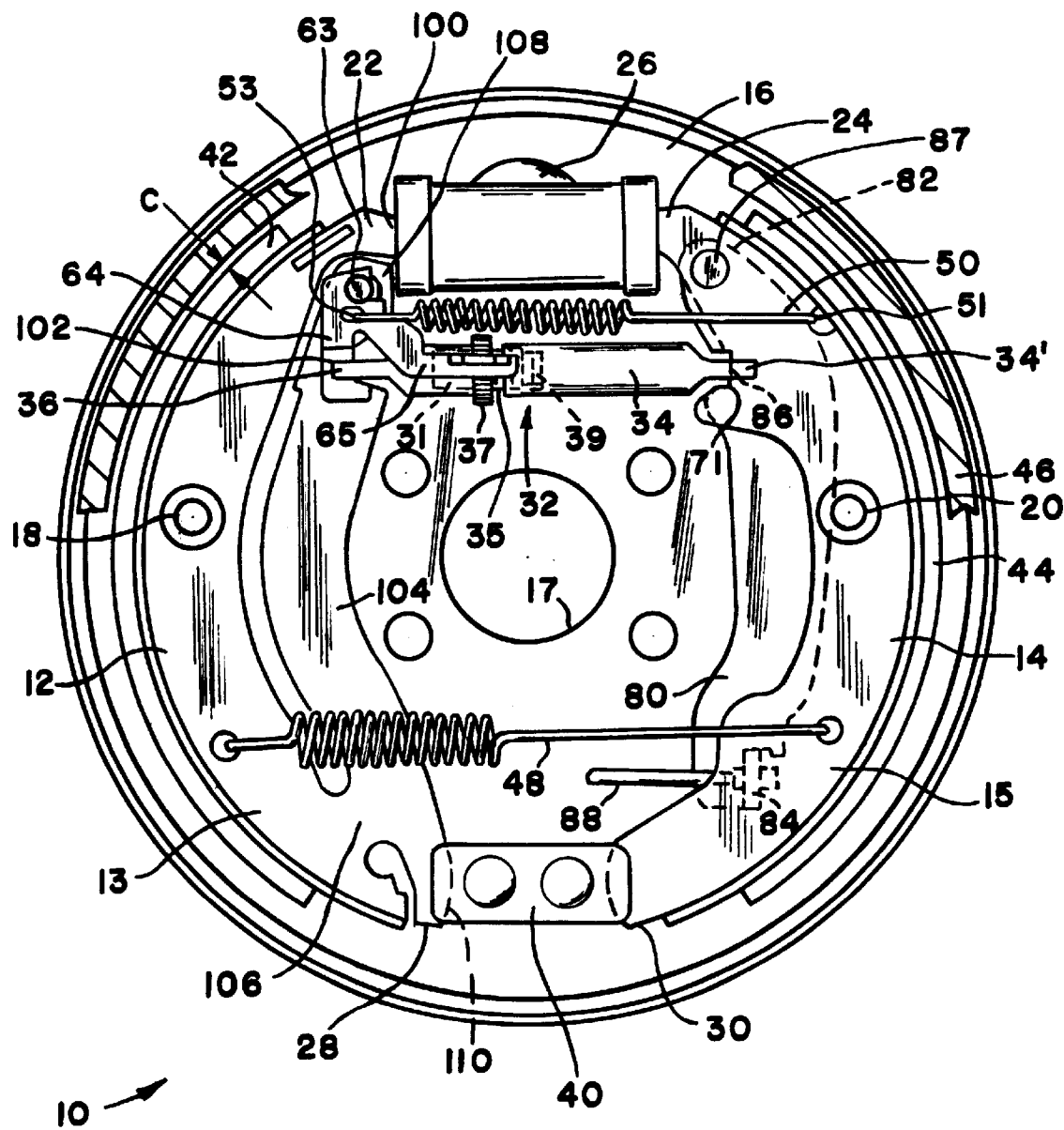
FIG. 1 is a schematic illustration of a drum brake made according to the principals of the present invention.
Figure 2:
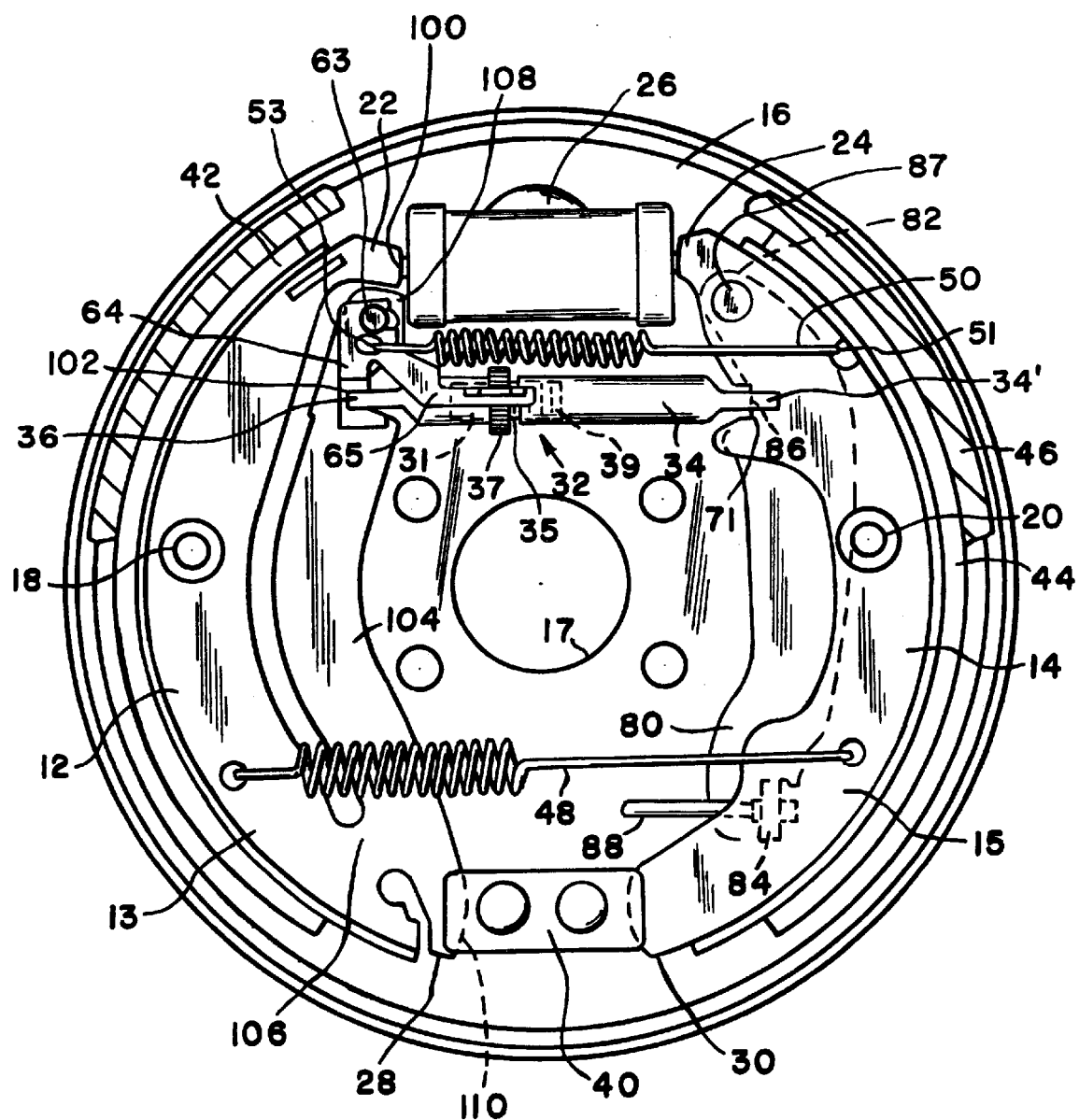
FIG. 2 is a schematic illustration of the drum brake of FIG. 1 with the brake shoes in an applied position resulting from a hydraulic application.
Figure 3:
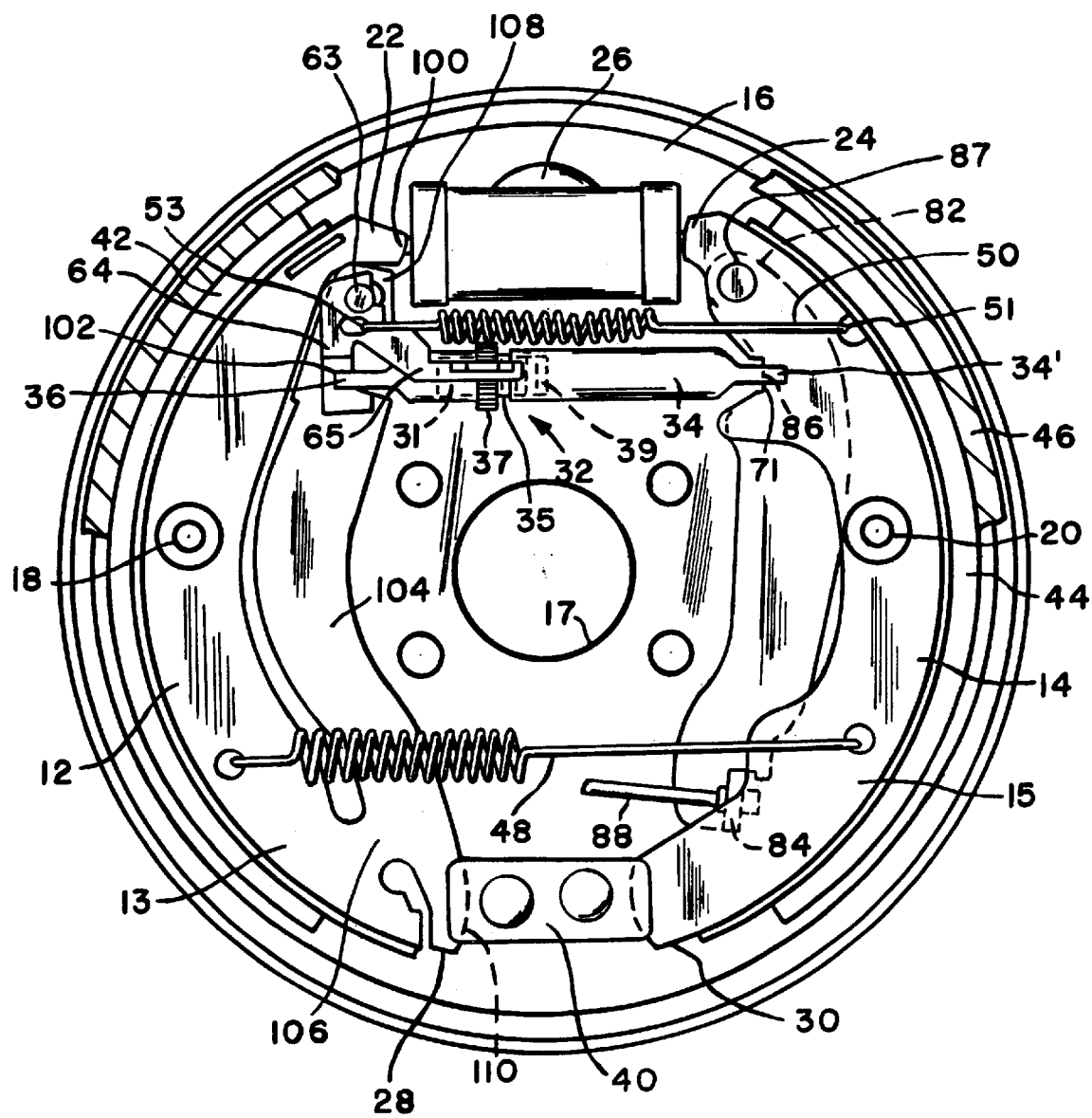
FIG. 3 is a schematic illustration of the drum brake of FIG. 1 with the brake shoes in an applied position resulting from a manual application.

The drum brake 10 as shown in FIGS. 1, 2 and 3 includes a backing plate 16 with an opening 17 for receiving an axle shaft of a vehicle. A hydraulic actuator assembly 26 is located at the top of the backing plate 16 and an anchor block 40 is aligned on the bottom of the backing plate 16. First 12 and second 14 brake shoes are retained on the backing plate 16 by first 18 and second 20 pins connected to a backing plate 16. Brake shoe 12 has a first end 22 and brake shoe 14 has a first end 24, respectively, connected to a hydraulic actuator assembly 26. Further brake shoe 1 2 has a second end 28 and brake shoes 14 has a second end 30, respectively, connected to anchor block 40 attached to the backing plate 16. An extendible mechanism 32 of a type illustrated in U.S. Pat. 4,502,574 and 5,480,010 is located between the webs 13 and 15 of brake shoes 12 and 14 respectively, to maintain a predetermined running clearance between first 42 and second 44 friction pads and a drum 46. A first spring 48 is connected to webs 13 and 15 for respectively urging the second ends 28,30 of the first 12 and second 14 brake shoes toward the anchor post 40. A second spring 50 has a first end 51 connected to web 15 and a second end 53 connected to indexing lever 64 retained on web 13 to urge the first ends 22,24 into engagement with the hydraulic actuator 26 and a first end member 34 and a second end member 36 of the extendible mechanism 32 into respective engagement with webs 13 and 15. When an operator desires to effect a brake application, an input in the form of pressurized fluid supplied to hydraulic actuator 26 to develop an actuation force that acts on and moves the first ends 22,24 of webs 13 and 15 outward to bring friction pads 42,44 into engagement with drum 46 to effect a first brake application during a service mode of operation.

The extendible member 32 includes a shaft or strut defined by a first end member 34 that is separated by a rotatable stem member 35 from a second end member 36. The stem member 35 has a first cylindrical surface 31 retained in the second end member 36, a second cylindrical surface 37 with a series of teeth thereon and a third cylindrical surface 39 with first threads thereon which mates with corresponding second threads located in the first end member 34. The indexing lever 64 which is pivotally attached to web 13 of brake shoe 12 by pin 63 has a pawl 65 which cooperates with the teeth 37 on the second cylindrical surface to incrementally rotate member stem 35 and extend the length of the extendible member 32 and adjust the length there between to maintain a desired clearance "C" between the friction pads 42,44 and brake drum 46.

According to the present invention, the web 13 of the first brake shoe 12 is defined by a first engagement surface 100 that receives the actuation force from the hydraulic actuator 26 and a second engagement surface 102 that receives the end of the second end member 36 of the extendible member 32. Web 13 has a projection 106 that extends therefrom to define a fulcrum for a cantilever arm 104. Cantilever arm 104 has a first end 108 that is free to move and a second end 110 that engages anchor 40. The second engagement surface 102 of web 13 is located adjacent the first end 108 of the cantilever arm 104 and proportionally moves as a function of the resilience of the fulcrum of projection 106 while second end 110 remains resiliently engaged with anchor 40. With the first engagement surface 100 being connected to the second engagement surface 102 through a cantilever arm 104, any movement of the first engagement surface 100 is also translated into movement of the second engagement surface 102 as a function of the resilience of the projection 106.

The drum brake 10 further includes a lever arm 80 with a first end 82 pivotally connected to web 15 adjacent the first end 24 and a second end 84 that extends toward the second end 30 of web 15 with a slot 86 located there between but closer to the first end 82. Slot 86 in conjunction with a slot 71 in web 15 receives the end 34' of the first end member 34 of the extendible member 32. The second end 84 of lever arm is connected to a cable 88 through which a manual input is applied to effect a parking brake application.

Operation of the Drum Brake

When an operator desires to effect a brake application or an electronic control unit associated with a sway or traction control feature of a brake, pressurized fluid is supplied to hydraulic actuator 26. Pressurized fluid supplied to the hydraulic actuator 26 acts on pistons therein to develop an actuation force that is transmitted into the first end 24 of web 15 and into the first end 22 of web 13 defined by the engagement surface 100 of web 13 to move the first 13 and second 15 webs through the running clearance "C" and bring friction pads 42 and 44 into engagement with drum 46 to effect a brake application, as illustrated in FIG. 2. Movement of the first engagement surface 100 toward the drum 46 causes end 28 of cantilever arm 104 to pivot with respect to anchor 40 and transmit a force to correspondingly pull end 108 along in a corresponding manner such that a distance between the second engagement surface 102 on cantilever lever 104 and the bottom of slot 71 as measured along the axis of the extendible member 32 increases. At the same time, spring 50 expands and causes indexing lever arm 64 to pivot on pin 63 such that the pawl 65 moves with respect to teeth 37 on the rotatable shaft 35 of the extendible member 32. Because of the resiliency of projection 106 as defined by its cross-sectional area and material, the distance end 108 of the cantilever 104 moves is always less than the movement of the first engagement surface 100 by the actuation force applied by the actuator 26. The effect of an actuation force applied to the first engagement surface 100 is proportionally reduced by a factor determined by the resilient movement of end 108 and the force of spring 50 and in pivoting of indexing lever 64 to move pawl 65 with respect to teeth 37. Thus, movement of the end 108 of the cantilever lever 104 is limited and as a result the extension of the extendible member 32 is inhibited if a running clearance between friction surface 42 and drum is within a predetermined minimum clearance limit. On termination of the hydraulic force acting on the first engagement surface 100, spring 48 pulls on webs 13 and 15 and spring 50 pulls on web 15 and indexing lever 64 to move the friction surface out of engagement with drum 46. When the running clearance is at a maximum, spring 50 rotates indexing lever 64 sufficiently for pawl 65 to engage teeth 37 and rotate stem 35 to extend the length of the extendible member 32 to define a minimum running clearance.

When an operator desires to effect a parking brake application, a manual input force is applied to end 84 of lever 80 through cable causing lever 80 to pivot on pin 87 and impart a corresponding actuation force to end 34' of the first end member that is transmitted through extendible member 32 to the second engagement surface 102 and causes cantilever lever 104 to pivot about end 110 and bring end 108 into engagement with web 13 to move the first brake shoe 13 toward drum 46 and after sufficient movement has occurred to close the running clearance to bring friction surfaces 42 and 44 into engagement with drum 46 to effect a parking brake application as illustrated in FIG. 3.

We claim:

1. An adjustment arrangement for a drum brake having a hydraulic actuator that engages a first web of a first brake shoe and a second web of a second brake shoe, said hydraulic actuator receiving a hydraulic input for developing an actuation force to move said first and second brake shoes from a rest position into engagement with a rotatable member to effect a brake application, an extendible member that is connected to said first web and said second web and is extendable to define a running clearance in a rest position between said first and second brake shoes and said rotatable member, a lever arm that is mounted on said first web and engages said extendable member and a resilient member that extends between said lever to said second web to urge said first and second webs into engagement with said hydraulic actuator, said lever arm pivoting with respect to said first web when said first web moves through said running clearance and when said running clearance reaches a predetermined maximum width pivots to provide for extension of said extendible member and establish a minimum width for said running clearance, said adjustment arrangement being characterized by said first web has a first segment that is connected to a second segment through an integral projection, said integral projection functioning as a fulcrum for said second segment to define a cantilever arm with a first end and a second end, first end being free to move while said second end engages an anchor for said first and second brake shoes, said first segment having a first engagement surface that is connected to said hydraulic actuator while said first end of said cantilever arm defines a second engagement surface that is connected to said extendible member, said first engagement surface receiving said actuation force from said hydraulic actuator for moving said first brake shoe through said running clearance and into engagement with said rotatable member to effect said brake application while movement of said first engagement surface in response to the actuation force is also communicated to said second engagement surface through said cantilever arm and is limited as a function of the location with respect to the second end of said cantilever arm and the resiliency of said projection.

2. The adjustment arrangement for a drum brake as recited in claim 1 wherein said first end of said cantilever arm is characterized by a pin on which said lever pivots.

3. The adjustment arrangement for a drum brake as recited in claim 2 wherein said fulcrum is characterized by being located adjacent said second end of said cantilever arm and as a result a total movement of said second engagement surface is not equal to a total movement of said first engagement surface on said first segment by said actuation force from said hydraulic actuator.

4. The adjustment arrangement for a drum brake as recited in claim 3 wherein said drum brake is further characterized by a manual lever pivotally connected to said second web and engaging said extendable member, said manual lever transmitting an manual input force through said extendable member into said first end of said cantilever arm and to said first segment of said first web through said fulcrum for moving said first brake shoe through said running clearance and into engagement with said rotatable member to effect a brake application.

5. The adjustment arrangement for a drum brake as recited in claim 4 wherein said cantilever arm pivots on said second end to transmit said manual input force through said fulcrum and into said first segment through for moving said first engagement surface to effect a brake application.

6. The adjustment arrangement for a drum brake as recited in claim 5 wherein after a predetermined deflection occurs in said projection said second engagement surface contact said first engagement surface and said manual input is thereafter directly transmitted to effect a brake application, said deflection being a function of the resiliency of said projection.

7. The adjustment arrangement for a drum brake as recited in claim 1 wherein said second end of said cantilever arm pivots on said anchor to transmit an actuation force through said fulcrum into said first segment corresponding to a manual input force applied to said second engagement surface through said extendable member to move said first brake shoe into engagement said rotatable member to effect a brake application.

8. An adjustment arrangement for a drum brake having a hydraulic actuator that engages a first web of a first brake shoe and a second web of a second brake shoe, said hydraulic actuator receiving a hydraulic input for developing an actuation force to move said first and second brake shoes from a rest position into engagement with a rotorable member to effect a brake application, an, extendible member that is connected to said first web and said second web and is extendable to define a running clearance in a rest position between said first and second brake shoes and said rotorable member, a lever arm that is mounted on one of said first and second webs and engages said extendable member and a resilient member that extends between said lever to the other of said first and second webs to urge said first and second webs into engagement with said hydraulic actuator and pivots said lever with respect to said one web when said running clearance reaches a predetermined maximum width to provide for extension of said extendible member and re-establish a minimum width for said running clearance, said adjustment arrangement being characterized by said first web having a first segment and a second segment, said first segment having a first engagement surface that is connected to said hydraulic actuator said first segment being connected to said second segment by a projection to define a fulcrum for said second segment such that a first end of said second segment defines a second engagement surface and a second end of said second segment engages an anchor for said first brake shoe, said first engagement surface being connected to said hydraulic actuator while said second engagement surface is connected to said extendible member, said first engagement surface receiving said actuation force from said hydraulic actuator to move said first brake shoe through said running clearance and into engagement with said rotorable member to effect said brake application, said actuation force acting on said first engagement surface being proportionally communicated through said fulcrum to move said second engagement surface with respect to said first engagement surface as a function of the location of said fulcrum with respect to said second end to correspondingly limit the extension of said extendible member.

9. The adjustment arrangement for a drum brake as recited in claim 8 wherein said second end of said second segment pivots with respect to said anchor in response to a manual force applied to said second engagement surface and transmits a into said first segment to move said first brake shoe into engagement said rotorable member to effect a brake application.

10. The adjustment arrangement for a drum brake as recited in claim 9 wherein said manual input force is initially transmitted from said second engagement surface through said fulcrum into said first engagement surface after said first end deflects sufficiently to engage said first engagement surface directly in effecting said manual brake application.

\* \* \* \* \*